(12) United States Patent
Nissinen et al.

(10) Patent No.: US 7,744,837 B2
(45) Date of Patent: Jun. 29, 2010

(54) REDUCING AGENT COMPOSITION

(75) Inventors: Timo Nissinen, Ylöjärvi (FI); Timo Härmä, Espoo (FI); Jari-Jukka Kukkonen, Oulu (FI)

(73) Assignee: Kemira Oyj (FI)

( * ) Notice: Subject to any disclaimer, the term of this patent is extended or adjusted under 35 U.S.C. 154(b) by 116 days.

(21) Appl. No.: 11/573,160

(22) PCT Filed: Aug. 3, 2005

(86) PCT No.: PCT/FI2005/000350
§ 371 (c)(1), (2), (4) Date: Sep. 19, 2008

(87) PCT Pub. No.: WO2006/013229
PCT Pub. Date: Feb. 9, 2006

(65) Prior Publication Data
US 2009/0010829 A1    Jan. 8, 2009

(30) Foreign Application Priority Data
Aug. 4, 2004    (FI) .................................. 20041057

(51) Int. Cl.
*B01D 53/56* (2006.01)
*B01D 53/94* (2006.01)
*C09K 3/00* (2006.01)

(52) U.S. Cl. .................. 423/213.2; 423/239.1; 60/299; 60/301; 252/183.11; 252/183.12; 252/183.13

(58) Field of Classification Search ............. 423/213.2, 423/239.1; 60/299, 301; 252/183.11, 183.12, 252/183.13
See application file for complete search history.

(56) References Cited

U.S. PATENT DOCUMENTS

| 5,116,584 | A | 5/1992 | Chen et al. |
|---|---|---|---|
| 6,387,336 | B2 | 5/2002 | Marko et al. |
| 7,595,034 | B2 * | 9/2009 | Nissinen et al. .......... 423/213.2 |

FOREIGN PATENT DOCUMENTS

| GB | 1111936 A1 | 5/1968 |
|---|---|---|
| JP | 2203923 A | 8/1990 |
| JP | 6319950 A | 11/1994 |
| JP | 8323151 A | 12/1996 |
| WO | 2004069385 A1 | 8/2004 |

OTHER PUBLICATIONS

International Search Report; International Application No. PCT/FI2005/000350, dated Oct. 20, 2005.

* cited by examiner

*Primary Examiner*—Timothy C Vanoy
(74) *Attorney, Agent, or Firm*—Cantor Colburn LLP

(57) ABSTRACT

The invention relates to a reducing agent composition for use in the catalytic reduction process of nitrogen oxides in exhaust gases, the composition containing 20-40 w % of urea, 19-40 w % of ammonium formate, and water.

18 Claims, No Drawings

REDUCING AGENT COMPOSITION

FIELD OF TECHNOLOGY

The invention relates to catalytic reduction of nitrogen oxides in exhaust gases and is directed to a reducing agent composition containing urea and other substances used in such reduction. The composition is applicable to catalytic treatment of exhaust gases especially from combustion processes, such as diesel combustion processes in vehicles, for instance.

BACKGROUND

Nitrogen oxides ($NO_x$) in the exhaust gases from combustion processes constitute a significant environmental hazard, and emissions of nitrogen oxides are subject to increasingly stringent restrictions. Diesel vehicles, especially commercial heavy-duty diesel vehicles, are subject to particularly stringent requirements. Under the Euro IV emission standard taking effect in Europe in 2005, the $NO_x$ emissions from heavy-duty diesel engines must not exceed 3.5 g/kWh, whereas the Euro V standard implemented in 2008 will limit the emissions to a maximum of 2 g/kWh.

The amount of nitrogen oxides in exhaust gases can be decreased by reducing these oxides. In principle, compounds containing ammonium nitrogen, such as ammonia, ammonium carbamate, ammonium carbonate, ammonium bicarbonate, ammonium formate, ammonium acetate, ammonium oxalate or ammonium hydroxide, can be used for this purpose.

A notable technical alternative in nitrogen oxide removal comprises the use of selective catalytic reduction (SCR techniques), in which nitrogen oxides are reduced into nitrogen and water by means of a catalyst and a reducing agent. Ammonia and urea have primarily served as reducing agents. The reducing temperature has usually been in the range 265-425° C., typically 300-400° C. For example $V_2O_5$-$TiO_2$ catalyst has been used as the catalyst. SCR techniques have the additional benefit of allowing a decrease of the fuel consumption of the engine. Namely, this allows application of higher temperatures, involving more complete combustion but lower nitrogen oxide formation.

In the SCR techniques of vehicles, ammonia and ammonia water involve a problem in terms of operational safety. For this reason, urea, which is almost risk free, is preferably used. Urea is preferred for the additional reason that it contains a double amount of nitrogen per mole compared to the ammonia salts mentioned above. In fact, an aqueous solution of urea is a most appropriate nitrogen oxide remover. Urea is usually dissolved to form an approx. 32.5% by weight solution (e.g. AdBlue, a product name used by VDA), yielding sufficiently high solubility and the lowest resistance to temperature of the solution (−11° C.). Thus, European car manufacturers have chosen these techniques in order to meet the increasingly stringent requirements (Selective Catalytic Reduction, Final Report, ACEA 23, June 2003).

However, in Northern Europe and colder regions in general, the problem is that the outdoor temperature is frequently below −11° C., resulting in an obvious risk of freezing of the urea solution. The risk of freezing is reduced by installing various temperature sensors and resistors, with the primary purpose of preventing freezing or of remelting the frozen urea solution into liquid form. Thus, there have been suggestions to add various additives to a urea solution especially to achieve a lower freezing temperature.

The literature mentions the use of ethanol [F. F. Mao et al. "Urea-ethanol-water solution for diesel NOx control Using Urea", 6th Diesel Engine Emissions Reduction (DEER) Workshop August 20-24] and propylene glycol [Lambert et al. "Application of Organic Freeze-Point Depressant in Aqueous Urea Solution: Effect of Nox Reduction", SAE2003-01-0775] as an anti-freezing agent of an aqueous solution of urea used in the reduction of nitrogen oxides in exhaust gases from a diesel combustion process. In addition, it is generally known to use carboxylic acids for a lower freezing temperature of urea solutions. Such a use has been described e.g. in GB 111936. However, U.S. Pat. No. 6,387,336 states that e.g. ammonium formate is inappropriate for use with the aim to lower the freezing temperature of a urea solution used in an SCR-process, due especially to its corrosive properties.

GENERAL DESCRIPTION OF THE INVENTION

A reducing agent composition and its use as defined in the independent claims has now been invented. The dependent claims define some preferred embodiments of the invention.

The composition contains urea, ammonium formate and water. The urea concentration is in the range 20-40%, such as 25-35%, especially 30-35%, calculated on the weight of the composition. The ammonium formate concentration is in the range 19-40%, such as 25-35%, especially 30-35%, calculated on the weight of the composition. The composition may be a solution or a dispersion, for instance.

Such a composition yields more ammonia than a corresponding amount of 32.5% urea solution. The ammonia yield may exceed 0.18 kg/kg of composition, such as 0.21 kg/kg, especially 0.24 kg/kg.

The composition may contain other necessary additives, such as anti-corrosive agents, e.g. alcohol, such as propanol or propargylic alcohol, or any other known anti corrosives of organic salts and acids, such as sulphonium compounds and alkyl ammonium compounds. However, the general trend is to avoid additives, because they may interfere with the catalytic operation or reduce the operating life of the catalyst.

The composition is usable e.g. in a reduction process having a maximum temperature of e.g. 700° C. such as 550° C., especially 450° C., more particularly 350° C. most particularly 250° C. The minimum temperature may be e.g. 120° C., such as 150° C. The invention has the special advantage of being operational at low temperatures, such as in the range 120-250° C. The catalyst may be any catalyst expedient in SCR techniques and operative at this particular temperature, and having also adequate efficiency and resistance under the operating conditions. E.g. a $V_2O_5$-$WO_3$, zeolite or $V_2O_5$-$TiO_2$ catalyst in a suitable structure may preferably be used as the catalyst.

The objects of application may comprise vehicles, especially diesel vehicles, such as light vehicles (e.g. passenger cars, light delivery vans), heavy-duty vehicles (e.g. heavy-duty delivery vans, lorries, articulated lorries) and power tools (e.g. forestry machines, mining machines). In addition to actual vehicles, the invention is also applicable to ships, for instance.

The composition comprises a notably greater amount of active ammonia than does an ordinary 32.5% urea solution. The required amount of solution will thus be smaller, and this is useful in many ways. Thus, for instance, a solution containing 30% of urea and 35% of ammonium formate contains 44% more ammonia than does a 32.5% urea solution.

In many cases, it is hard to find space in vehicles, especially light vehicles, for a reducing agent tank, a feed apparatus and catalysts. This results in a compromise regarding the size of the reducing agent tank, with the natural consequence of shorter filling intervals. However, the invention allows the use of smaller tanks and dosage systems, yet without shortening filling intervals. This is very useful especially in small vehicles. Sufficiently long filling intervals, equalling the service intervals, for instance, allow for quite carefree use of SCR reduction and easy reducing solution logistics. This simultaneously decreases the risk that reduction is neglected for the sake of convenience.

Unless a smaller tank is desirable, the same tank may accordingly serve over longer distances. This is particularly useful in heavy-duty vehicles, which consume larger amounts of the composition.

Thus, for instance, the same amount of a solution containing 30% of urea and 35% of ammonium formate will be sufficient over a distance 54% longer than does a conventional 32.5% urea solution.

As the necessary amount of reducing agent composition decreases, the required catalyst surface decreases accordingly, allowing for a smaller catalyzer size.

The transportation cost of the composition also decreases. This is true both for the transportation of the composition to the distribution points and the transportation as dosed in the vehicle at the site of application.

The freezing temperature of the composition is lower than that of a pure urea solution containing ammonia in an equal amount. It has also been found that solutions containing ammonium formate freeze at a slower rate than do pure urea solutions. Moreover, an ammonium formate solution has a smaller volume increase during freezing than does a urea solution. The handling of the solution under cold conditions will thus be easier not only during the actual use but also during transportation, storage and distribution. The risk of damage to the apparatus, such as tanks, hoses, feed devices and meters, caused by freezing will also be reduced.

The composition of the invention allows for reduction with excellent conversion rates also at low temperatures. When added to a urea solution, for instance, ammonium formate enhances $NO_x$ conversion e.g. in the temperature range 150-550° C., especially in the range 150-250° C. This is advantageous in particular after cold starting, the temperatures of the engine, the exhaust gases and the catalyst being low. Such a reduction process is suitable for use e.g. during purification of exhaust gases from a diesel combustion process. Regarding diesel vehicles, efficient purification also at low temperatures is especially useful. For instance, in many cases, city buses and smaller vehicles run over long distances at very low engine temperatures when driving with low power and frequent stops.

It has also been found that ammonium formate additions to the urea solution reduce pollution of the catalyst. This results in longer service life of the catalyst.

The invention allows optimation of the reducing agent composition used in a vehicle with respect to the operating conditions (e.g. temperature), vehicle type and the suitable filling interval in each case.

When the composition of the invention is used, the vehicle is provided with a reducing agent tank. The composition is supplied through a feed apparatus (a pump, piping, nozzles, etc.) to an SCR catalyst in the exhaust gas line. In addition to the SCR catalyst, the system may comprise preoxidation, hydrolytic and post-oxidation catalysts. Contrary to what has been mentioned in U.S. Pat. No. 6,387,336 cited above, it has also been found that the use of ammonium formate in the compositions does not cause any special corrosion problems regarding the apparatus materials such as stainless steel and plastic materials conventionally used in such a process.

Increased $CO/CO_2$ emissions are a potential drawback. However, any CO produced can be efficiently oxidised by means of a post-oxidation catalyst.

A solution containing ammonium formate has equally good operational safety as a pure urea solution. Its environmental impact is also substantially the same.

Some features of the invention are described in further detail below by means of examples.

EXAMPLE 1

Various aqueous solutions of urea and ammonium formate were prepared. The enclosed table 1 shows the compositions of the solutions, the overall amount of ammonia obtained from urea and ammonium formate, the density of the solution and the freezing temperature measured.

The table also indicates the running distance allowed by a 40 l tank, and accordingly, the size of a tank required for 10000 km of running. Reduction solution 1 used as a reference (urea) is consumed at a rate of 0.25 l/100 km. This is based on studies conducted with a 2.5 l diesel engine (Lueders H et al., An Urea Lean $NO_x$ Catalyst System for Light Duty Diesel Engines, SAE 952493, 1995). The feed ratio $NH_3/NO_x$ is 1.0.

TABLE 1

| No | Amm. form. w % | Urea w % | $NH_3$ kg/kg | Density (24° C.) kg/dm³ | Freezing point ° C. | Distance covered with a 40 l tank km | Amount of solution for 10,000 km l |
|---|---|---|---|---|---|---|---|
| 1 |  | 32.5 | 0.18 | 1.09 | −11 | 16000 | 25 |
| 2 | 18.9 | 23.5 | 0.18 | 1.11 | −25 | 16279 | 24.6 |
| 3 | 10 | 30 | 0.19 | 1.11 | −11 . . . −15 | 16828 | 23.8 |
| 4 | 20 | 30 | 0.22 | 1.14 | −11 . . . −15 | 20275 | 19.7 |
| 5 | 30 | 30 | 0.25 | 1.16 | −11 . . . −15 | 23202 | 17.2 |
| 6 | 35 | 30 | 0.26 | 1.17 | −11 . . . −15 | 24711 | 16.2 |

It can be seen that e.g. solution 6, which contains 30% of urea and 35% of ammonium formate, contains 44% more ammonia than does pure urea solution 1. However, the freezing point is lower than that of the urea solution. Accordingly, an equal amount of this solution will suffice over a 54% longer distance than does the urea solution.

EXAMPLE 2

Enclosed table 2 provides calculations corresponding to example 1 for a heavy-duty vehicle, for which the consumption of reference reduction solution 1 (urea) is 1.5 l/100 km. Column 7 indicates the distance covered with a 100 l tank.

TABLE 2

| No | Amm. form. w % | Urea w % | $NH_3$ kg/kg | Density (24° C.) kg/dm³ | Freezing point ° C. | Distance run with a 100 l tank km | Amount of solution for 10,000 km l |
|---|---|---|---|---|---|---|---|
| 1 |  | 32.5 | 0.8 | 1.09 | −11 | 6667 | 150 |
| 2 | 18.9 | 23.5 | 0.18 | 1.11 | −25 | 6783 | 147 |
| 3 | 10 | 30 | 0.19 | 1.11 | −11 . . . −15 | 7012 | 143 |
| 4 | 20 | 30 | 0.22 | 1.14 | −11 . . . −15 | 8448 | 118 |
| 5 | 30 | 30 | 0.25 | 1.16 | −11 . . . −15 | 9668 | 103 |
| 6 | 35 | 30 | 0.26 | 1.17 | −11 . . . −15 | 10296 | 97 |

It can be seen for instance, that driving over a 10,000 km distance consumes 35% less of solution 6 than of urea solution 1.

EXAMPLE 3

Various solutions of urea ammonium formate were made and their freezing point and volume change caused by freezing were determined.

TABLE 3

| Property | Unit | Amm. form. 40% | Amm. form. 19.0% Urea 23.5% | Amm. form. 12.6% Urea 26.5% | Urea 32.5% |
|---|---|---|---|---|---|
| Freezing point | ° C. | −35 | −24 | −17 | −11 |
| Density (20 ° C.) | kd/dm$^3$ | 1.095 | 1.113 | 1.106 | 1.090 |
| Expansion (+20 -> −35° C.) | % | 5.8 | 6.0 | 6.4 | 6.9 |

Expansion (20° C.→−35° C.) implies the percentage by which the volume increases when a 20° C. solution freezes into solid state. Ice density=0.918 kg/dm$^3$. It was found that an addition of ammonium formate to urea drops the freezing point and reduces the volume change caused by freezing. It was also found that ammonium formate addition retards the freezing process. The addition of ammonium formate yields the practical benefit of reducing the freezing risk of the solution while alleviating problems caused by the solution freezing in the system, such as damage to the piping, tank or feed apparatus, etc.

EXAMPLE 4

Reduction tests were conducted with a diesel engine using aqueous solutions of ammonium formate and urea (20%/20%) with a view to optimized conversion and solution concentration. The reduction solutions were fed into the exhaust piping before the SCR catalyst.

When pure urea was used, precipitations were visually observed both in the catalyst and the exhaust piping. The precipitations consist of urea and polymerization products of urea. Such precipitations naturally deteriorate the catalyst effect and thus conversion of nitrogen oxides into nitrogen and water.

The tests also confirmed that an increased proportion of ammonium formate in the mixture decreased the deposits in the exhaust piping and the catalyst. When merely an aqueous solution of ammonium formate was used, there were no observations at all of deposits.

Consequently, the use of ammonium formate has the advantage of the SCR catalyst remaining unpolluted. A catalyst should have a long service life in a car, i.e. of the same order as that of the car itself. Cleaning or replacement of catalysts incur higher costs for the user of the car.

The invention claimed is:

1. A reducing agent composition to be added to the catalytic reduction process of nitrogen oxides from the exhaust gases, characterised in that the reducing agent composition comprises 20-40% of urea calculated on the weight of the composition, 20-40% of ammonium formate calculated on the weight of the composition, and water.

2. A composition as defined in claim 1, comprising 25-40% of urea calculated on the weight of the composition.

3. A composition as defined in claim 1, comprising 30-35% of urea calculated on the weight of the composition.

4. A composition as defined in claim 1, containing 25-40% of ammonium formate calculated on the weight of the composition.

5. A composition as defined in claim 4, containing 30-35% of ammonium formate calculated on the weight of the composition.

6. A composition as defined in any of claim 1, which provides ammonia to the reduction process in an amount exceeding 0.18 kg/kg of the composition.

7. A composition as defined in claim 1, which provides ammonia to the reduction process in an amount exceeding 0.21 kg/kg of the composition.

8. A composition as defined in claim 7, which provides ammonia to the reduction process in an amount exceeding 0.24 kg/kg of the composition.

9. A composition as defined in claim 1, wherein the composition is added to a selective catalytic reduction process.

10. A composition as defined claim 1, further comprising an anti-corrosive agent.

11. A method for the selective catalytic reduction of nitrogen oxides in an exhaust gas, comprising supplying to an selective catalytic reduction catalyst in an exhaust gas line a reducing agent composition comprising 20-40% of urea calculated on the weight of the composition, 20-40% of ammonium formate calculated on the weight of the composition, and water.

12. The method as defined in claim 11, wherein the selective catalytic reduction of nitrogen oxides is in an exhaust gas from a diesel vehicle.

13. The method as defined in claim 11, wherein the selective catalytic reduction of nitrogen oxides is in an exhaust gas from a light vehicle, a heavy-duty vehicle, a power tool, or a ship.

14. The method as defined in claim 13, wherein the selective catalytic reduction of nitrogen oxides is in an exhaust gas from a light vehicle.

15. The method as defined in claim 11, wherein the selective catalytic reduction process has a maximum temperature of 700° C.

16. The method as defined in claim 15, wherein the selective catalytic reduction process has a minimum temperature of 120° C.

17. A method for reducing the volume of a reducing agent tank, comprising supplying to a selective catalytic reduction catalyst in an exhaust gas line the reducing agent composition of claim 1.

18. A method for increasing the filling intervals of a reducing tank, comprising supplying to a selective catalytic reduction catalyst in an exhaust gas line the reducing agent composition of claim 1.

* * * * *